United States Patent
Baldwin et al.

(10) Patent No.: US 10,530,135 B1
(45) Date of Patent: Jan. 7, 2020

(54) CABLE CONDUIT ELECTRICAL BOX

(71) Applicants: Jeffrey Baldwin, Desert Hills, AZ (US); John Klein, Gilbert, AZ (US); Ryan Liebengood, Gilbert, AZ (US)

(72) Inventors: Jeffrey Baldwin, Desert Hills, AZ (US); John Klein, Gilbert, AZ (US); Ryan Liebengood, Gilbert, AZ (US)

(*) Notice: Subject to any disclaimer, the term of this patent is extended or adjusted under 35 U.S.C. 154(b) by 0 days.

(21) Appl. No.: 16/167,980

(22) Filed: Oct. 23, 2018

Related U.S. Application Data

(63) Continuation of application No. 14/190,066, filed on Feb. 25, 2014, now Pat. No. 10,109,989.

(60) Provisional application No. 61/775,528, filed on Mar. 9, 2013.

(51) Int. Cl.
| | |
|---|---|
| *H02G 3/08* | (2006.01) |
| *H02G 3/14* | (2006.01) |
| *H02G 3/22* | (2006.01) |
| *H02G 3/04* | (2006.01) |
| *H02G 3/10* | (2006.01) |

(52) U.S. Cl.
CPC .............. *H02G 3/04* (2013.01); *H02G 3/045* (2013.01); *H02G 3/0418* (2013.01); *H02G 3/0431* (2013.01); *H02G 3/0437* (2013.01); *H02G 3/105* (2013.01); *H02G 3/22* (2013.01)

(58) Field of Classification Search
None
See application file for complete search history.

(56) References Cited

U.S. PATENT DOCUMENTS

| | | | |
|---|---|---|---|
| 832,508 A | 10/1906 | Slocum | |
| 3,281,005 A | 10/1966 | Schumacher | |
| 4,531,794 A | 7/1985 | Heverly | |
| 4,875,881 A | 10/1989 | Caveny | |
| 5,143,868 A * | 9/1992 | Caveney | H01R 13/73 439/535 |
| 5,300,731 A * | 4/1994 | DeBaratolo, Jr. | H02G 3/105 174/492 |
| 5,770,817 A | 6/1998 | Lo | |
| 5,917,982 A | 6/1999 | Vargas | |
| 5,995,699 A | 11/1999 | Vargas | |
| 6,262,365 B1 | 7/2001 | Ewer | |
| 6,342,675 B1 | 1/2002 | DeBartolo | |
| 6,350,948 B1 | 2/2002 | Decore | |
| 6,353,181 B1 | 3/2002 | Jarry | |
| 6,462,270 B1 | 10/2002 | Deep | |
| 6,663,199 B1 * | 12/2003 | Buard | H02G 3/105 174/365 |
| 6,854,226 B2 | 2/2005 | Cole | |
| 7,183,501 B2 | 2/2007 | Bowman | |
| 7,285,733 B2 | 10/2007 | Bowman | |
| 7,385,148 B2 | 6/2008 | Picard | |
| 7,842,888 B2 | 11/2010 | Ahn | |
| 8,013,242 B1 | 9/2011 | Thibault | |
| 2012/0037766 A1 | 2/2012 | Buras, Jr. | |

* cited by examiner

*Primary Examiner* — Dimary S Lopez Cruz
(74) *Attorney, Agent, or Firm* — Booth Udall Fuller, PLC

(57) ABSTRACT

A cable conduit electrical box including a base having at least one opening for receiving a cable conduit, a cover removably attachable to the base, and an adapter removably positioned on the base or the cover for sealing the at least one opening around the cable conduit. The adapter may be secured with mounting tabs or mounting apertures.

9 Claims, 7 Drawing Sheets

CABLE CONDUIT ELECTRICAL BOX

CROSS-REFERENCE TO RELATED APPLICATIONS

This application is a continuation application of U.S. patent application Ser. No. 14/190,066, filed on Feb. 25, 2014, to Baldwin et al., titled CABLE CONDUIT ELECTRICAL BOX that issues as U.S. Pat. No. 10,109,989 on Oct. 23, 2018, which application claims priority to U.S. Provisional Patent Application No. 61/775,528, filed on Mar. 9, 2013, the disclosures of which are hereby incorporated herein by reference.

BACKGROUND

1. Technical Field

Aspects of the present disclosure relate generally to cable conduit and more specifically to cable conduit electrical boxes for securing an electrical device which hides line voltage cables and low voltage cables on a wall for a more aesthetically pleasing appearance.

2. Background Art

Electrical cords and plugs are well known and are used to provide electrical current to a number of devices. Modern televisions are light enough to be hung on the wall, yet still need to be connected to an electrical outlet. In new construction, an electrical outlet can be located where a television will ultimately be mounted, yet the majority of households have electrical outlets near the floor. In these instances, the television electrical cable droops from the mounted television to reach the electrical outlet near the floor and creates an unsightly appearance. Further, DVD players, cable boxes, and similar devices which play through the television must be connected to the television with an HDMI cable or other suitable cable. These cables then must be run up the wall and further clutters the television's appearance. In other applications an electrical box may not be properly positioned and a homeowner would then have to cut into the wall and run appropriate electrical wiring behind the wall.

SUMMARY

Aspects of this disclosure relate to an aesthetically pleasing cable conduit and electrical boxes. In one aspect, a cable conduit electrical box including a base having at least one opening for receiving a cable conduit, a cover removably attachable to the base, and an adapter removably positioned on the base or the cover for sealing the at least one opening around the cable conduit.

In an implementation, the adapter may further include at least one mounting tab engageable with the base or the cover. The adapter may further include three mounting tabs engageable with the base or the cover. The adapter may further include an aperture corresponding to a width and a height of the cable conduit. The adapter may not include an aperture where the cable conduit is absent. The adapter may be slidably engaged in the cover.

The cover may further include a track arranged to receive the adapter. The track may further include a locking tab. The adapter may further include a locking tab arranged for engagement with the track locking tab. The adapter may further include removable portions to receive cable conduit of a smaller dimension. The base may further include at least one mounting pin. The at least one mounting pin may be positioned adjacent the at least one opening. The adapter may further include at least one mounting aperture. The adapter at least one mounting aperture may be secured to the at least one opening. The adapter may further include a tab engageable with a track in the cover.

In another aspect, a cable conduit electrical box includes a base having at least one opening for receiving a cable conduit and at least one mounting device adjacent the at least one opening, a cover removably secured to the base, an adapter having at least one mounting aperture and a conduit aperture, and wherein the adapter at least one mounting aperture is engaged with the base at least one mounting device.

In another aspect, the method of mounting a cable conduit electrical box includes the steps of providing the cable conduit electrical box having a base, a cover, and an adapter, mounting the base to a wall, mounting the cable conduit to the wall with an end of the cable conduit adjacent an opening in the base, selecting the adapter having an conduit opening sized to seal the cable conduit, mounting the adapter to the base or the cover, and installing the cover to the base.

In an implementation, the step of mounting the adapter may include the step of mounting the adapter to the base. The step of mounting the adapter may include the step of mounting the adapter to the cover. The method may include the step of positioning the adapter in a track within the cover.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DETAILED DESCRIPTION

This disclosure, its aspects and implementations, are not limited to the specific components or assembly procedures disclosed herein. Many additional components and assembly procedures known in the art consistent with the intended operation and assembly procedures for a cable conduit electrical box will become apparent for use with implementations of a cable conduit electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a cable conduit electrical box.

Figure 1:
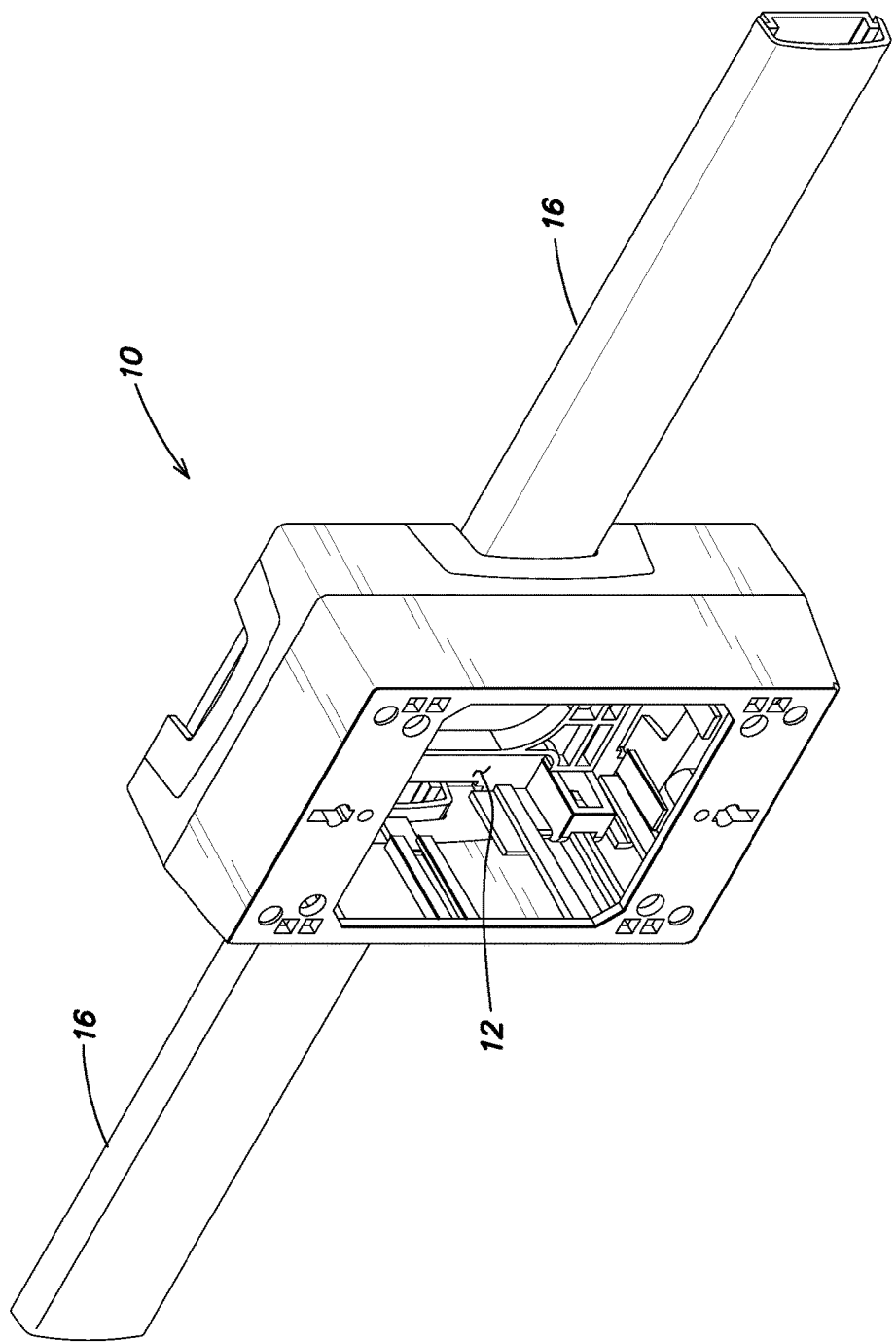
FIG. 1 is a perspective view of a cable conduit electrical box mounted on a wall with cable conduit connected.
Figure 2:
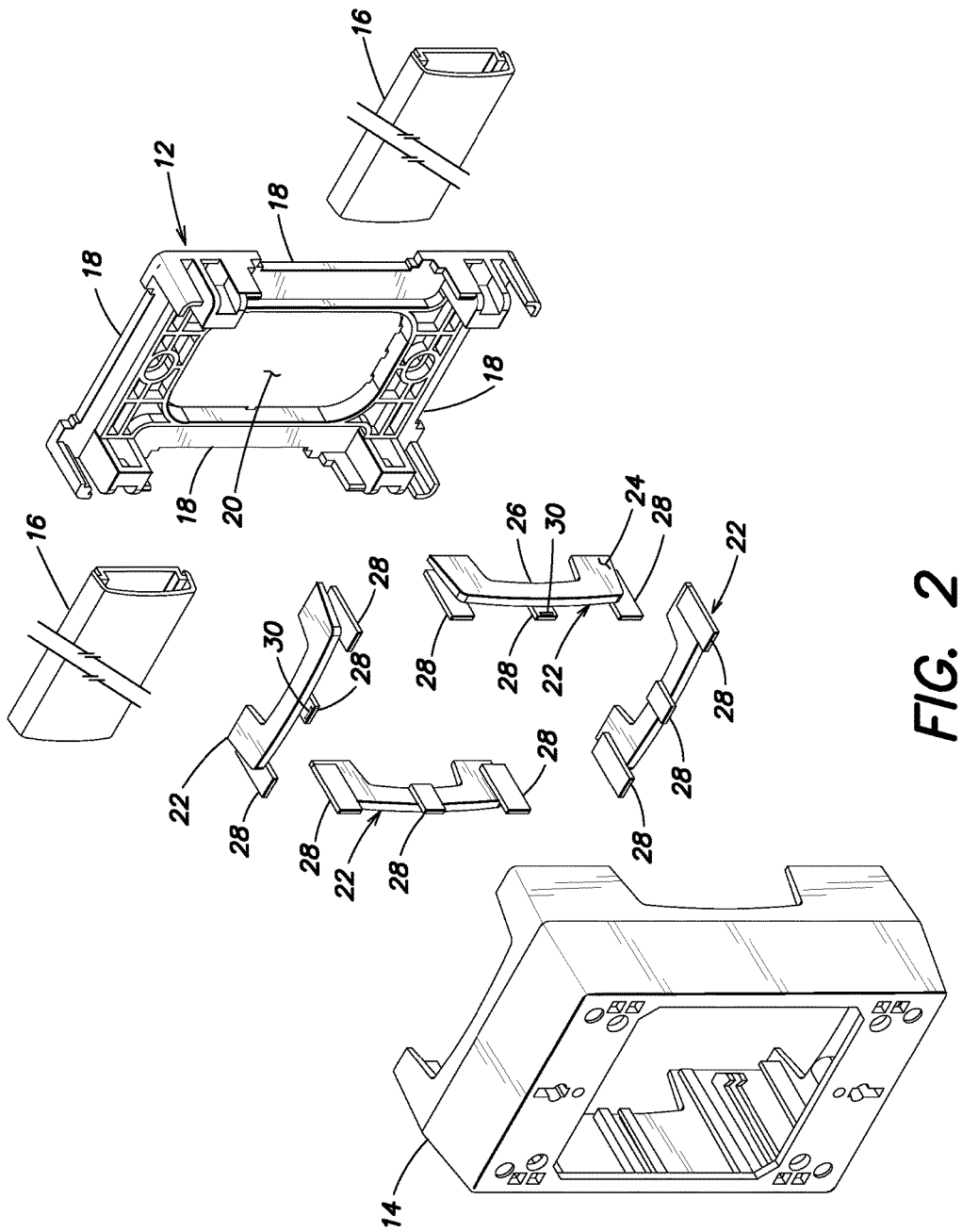
FIG. 2 is an exploded view of a first implementation cable conduit electrical box.

FIGS. 1 through 6 illustrate a first implementation cable conduit electrical box 10 having a base 12 and a cover 14, the cable conduit electrical box 10 arranged to receive cable conduit 16 in connection with the base 12 and cover 14. Referring to FIG. 2, base 10 may include a plurality of base openings 18 and a central opening 20 for receiving an electrical device or other suitable component. Base openings 18 may be positioned on each straight side of base 12 or in any suitable location which is arranged to receive cable conduit 16. The base openings are preferably sized and shaped to receive cable conduit of the largest commercially available size so that the cable conduit electrical box 10 is generally universally sized. Further, base openings 18 are generally recessed within base 12 enough so that the cable conduit 16 end portions may be protected and retained at least partially within the cable conduit electrical box 10. For example, base 12 and cover 14 may be any suitable shape, including, but not limited to, round, square, rectangular, or octagonal. The base 12 may also include various known protrusions for receiving and holding the cover 14 in a snap-like or locking mechanism as will be discussed in greater detail below.

Adapters 22 may be sized to suitably fit within the area of base openings 18, with the adapters 22 having a body 24 and conduit openings 26 of various sizes. The adapters may further include at least one or more adapter tabs 28 and one or more of the adapter tabs 28 may include a locking tab 30. In one implementation, the cable conduit electrical box 10 includes a plurality of adapters 22 with different sizes of conduit openings 26 that are arranged to fit various width and height of cable conduit 16. Further, adapters 22 may include blanks or other suitable filler components that do not include conduit openings 26 for base openings 18 which are not receiving cable conduit 16 to advantageously seal the cable conduit electrical box 10.

Figure 4:
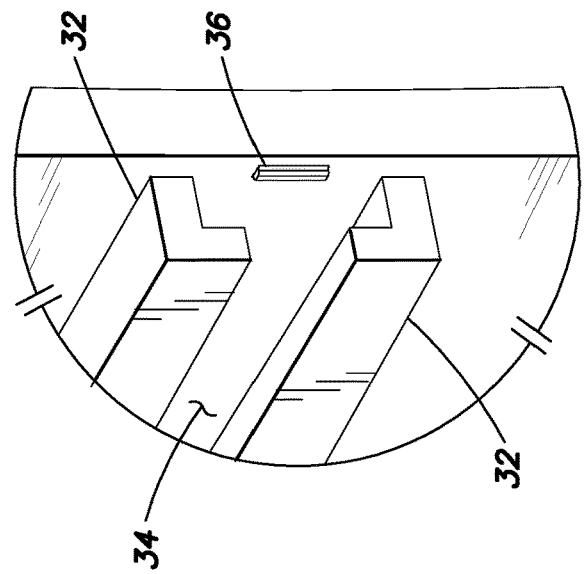
FIG. 4 is an enlarged view of the section labeled A in FIG. 3.
Figure 3:
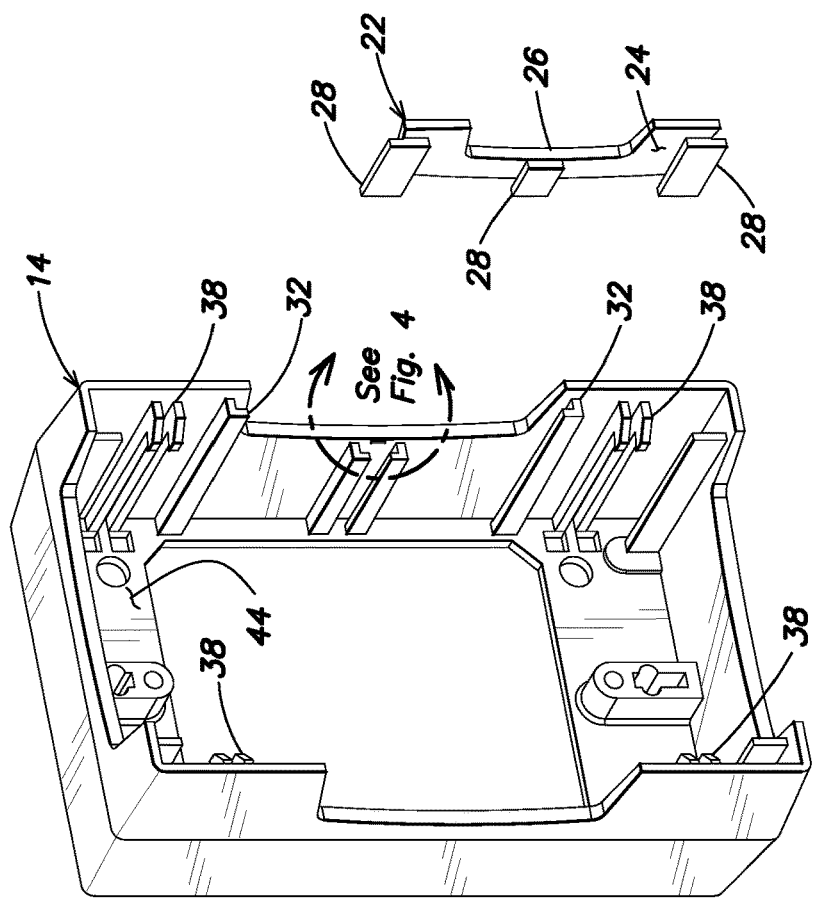
FIG. 3 is a rear view of the first implementation cable conduit electrical box cover and an adapter.
Figure 5:
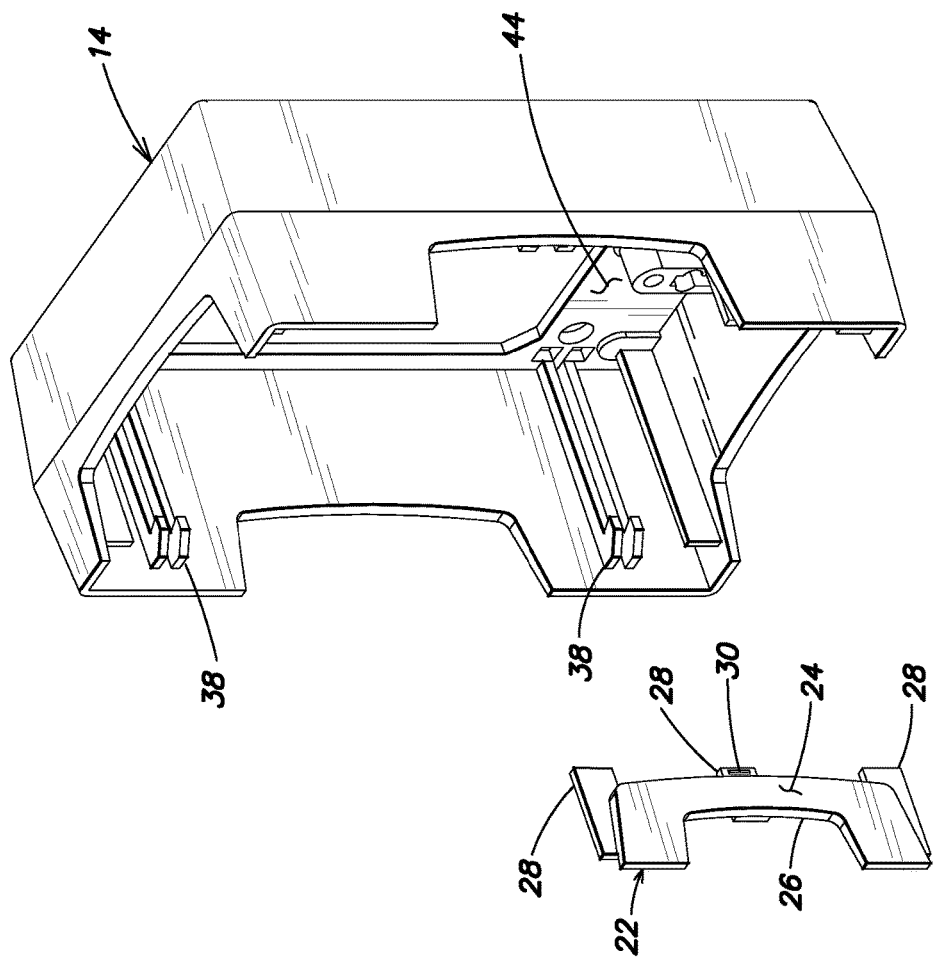
FIG. 5 is a perspective view of the first implementation cable conduit electrical box cover and adapter.
Figure 6:
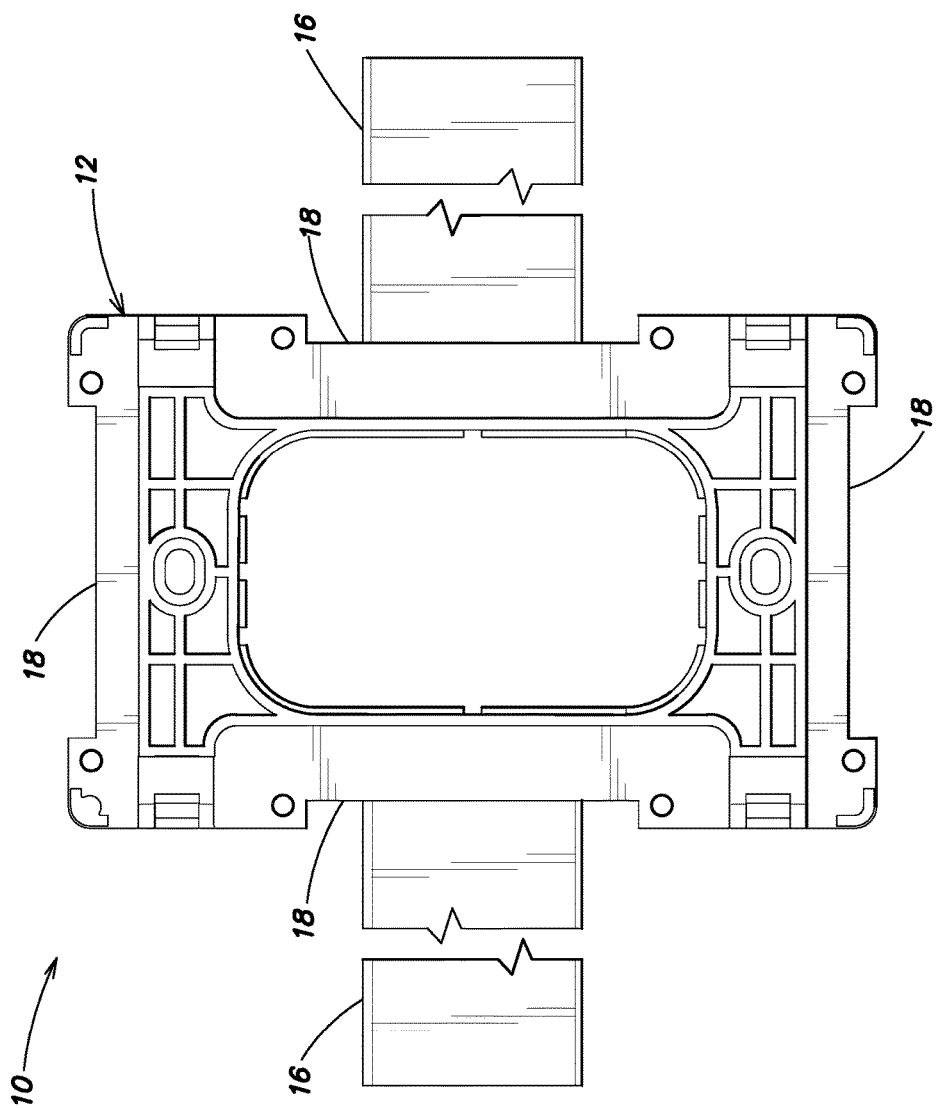
FIG. 6 is a rear view of a cable conduit electrical box with cable conduit connected.

FIGS. 3-5 illustrate various views of cover 14 and an interior cavity 44 with a cover track 32 having a cover track slot 34 and a track locking tab 36. Further, cover connectors 38 are shown which are used to interact with base 12 to removably secure the cover 14 to the base 12. As shown in FIG. 3, cover track slot 34 may include one or more tracks arranged to align with and receive adapters 22 and specifically adapter tabs 28 therein. In the implementation shown, three adapter tabs 28 are shown and three corresponding cover track slots 34 are used to receive the three adapter tabs 28, although any suitable number of mounting tabs may be utilized. The adapters 22, cover tracks 32, and track slots 34 are preferably positioned at each location on base 12 and cover 14 where cable conduit 16 may be positioned. The track slots 34 may also include the locking tab 36 arranged for engagement with adapter locking tab 30 when adapter 22 is positioned within the track slots 34.

As can be envisioned from the illustrations, it is advantageous to first secure base 12 to a wall structure and then cut cable conduit 16 to the appropriate length so that it terminates within base opening 18. With the terminating end of cable conduit 16 positioned within base opening 18, the user then selects an adapter 22 having an appropriately sized adapter conduit opening 26 and the adapter 22 is secured within cover 14 and cover track slot 34 until adapter locking tab 30 engages track locking tab 36. The user will also insert any suitable blank adapters, or those adapters without adapter conduit openings 26 therein and locate the blank adapters in any cover track slots 34 which are not receiving cable conduit 16. The user may then secure the cover 14 to base 12 to thereby enclose the cable conduit electrical box 10 with cable conduit 16 appropriately positioned within the base 12 and cover 14 and sealed from the surrounding environment as can also be seen in FIG. 6.

Figure 7:
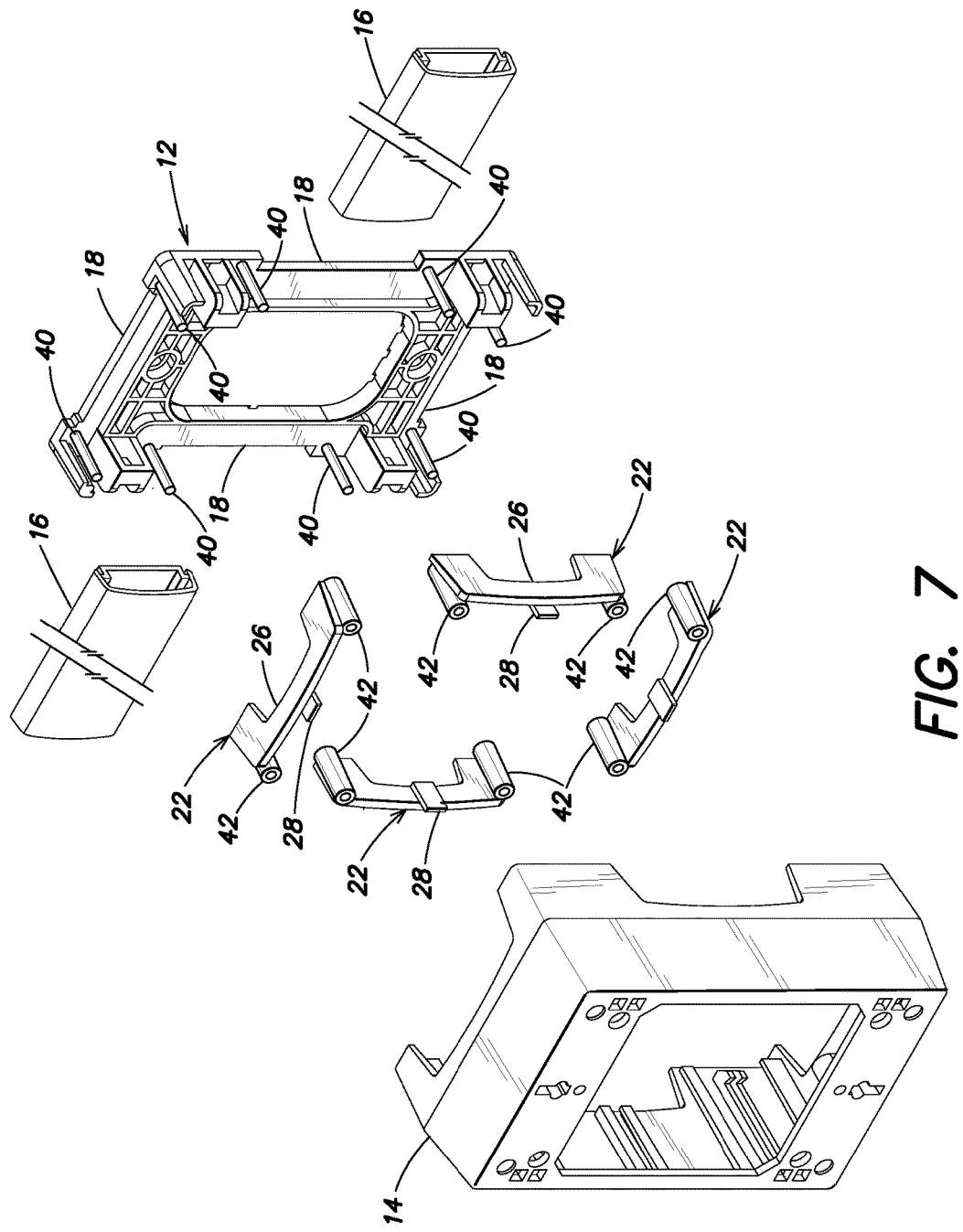
FIG. 7 is an exploded view of a second implementation cable conduit electrical box with adapters.
Figure 8:
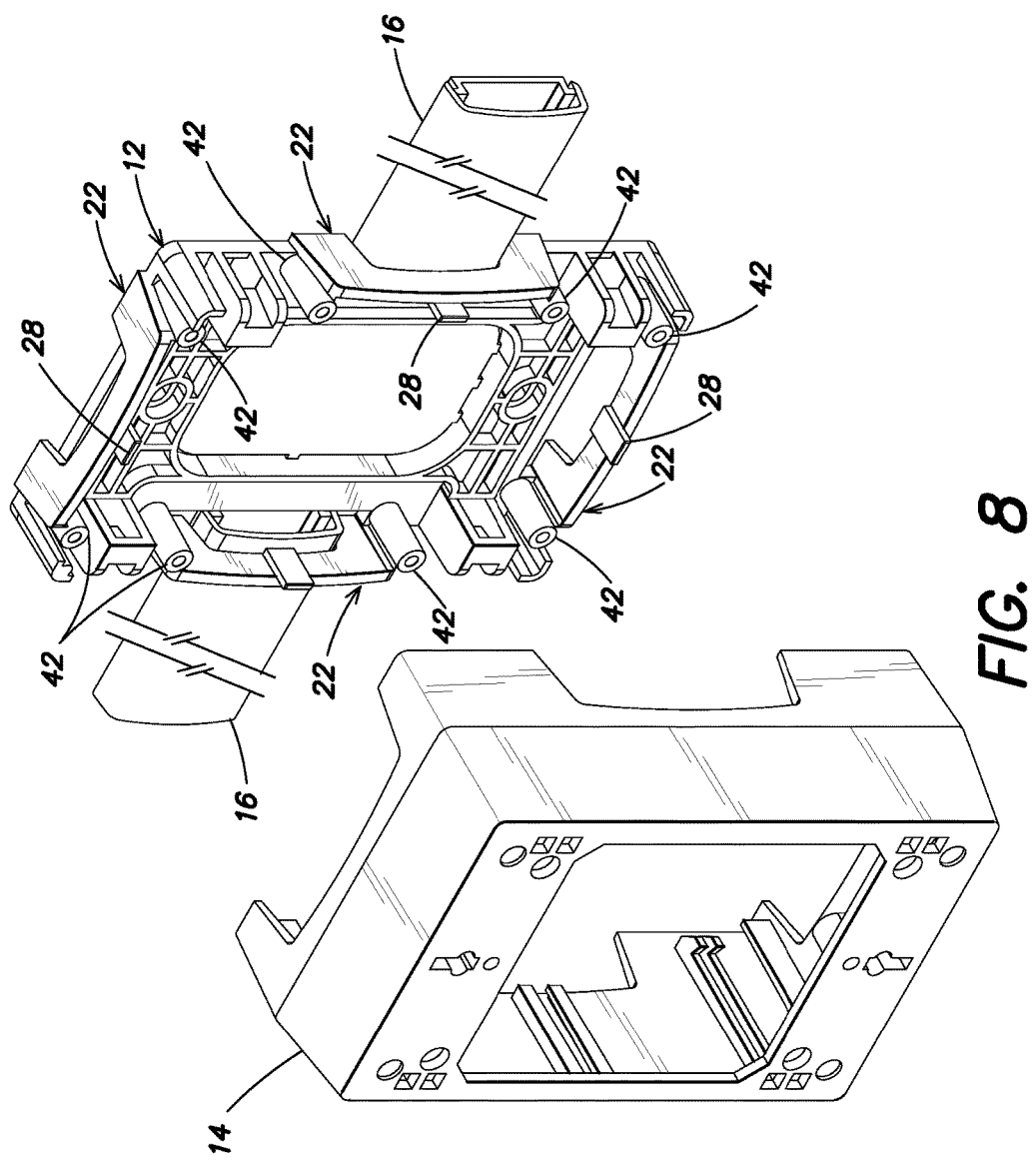
FIG. 8 is a perspective view of the second implementation cable conduit electrical box with the cover separated from the base and adapters.

FIGS. 7 and 8 illustrate another implementation of a cable conduit electrical box 10 having structure similar to the first implementation described above. Immediately noticeable differences are a plurality of mounting pins 40 positioned on base 12 adjacent base openings 18. Specifically, in one application, mounting pins 40 are positioned on each side of each base opening 18 such that, by way of non-limiting example, when four base openings 18 are utilized, there may be 8 mounting pins 40 in base 12. Adapters 22 may also be slightly modified to incorporate body 24 having conduit openings 26 arranged to be selectively sized for various cable conduits 16. The adapters 22 may further include a mounting tab 28 with a locking tab 30 to connect the adapter to cover 14. Specifically, adapters 22 include one or more adapter mounting apertures 42 which are aligned with and arranged to be securely mated with mounting pins 40 to seal the area around cable conduit 16 and base 18 or the area of base 18 if no cable conduit is utilized. Once again, adapters 22 may include a variety of different conduit openings 26, may be blank (i.e. not have any conduit opening), and/or may have removable portions such that the user can remove any necessary adapter portions and select the appropriate sized conduit opening 26.

While installation is similar to the first implementation, the user may decide to install the adapters on base 12 before installing cover 14 or may select to install the adapters within cover 14 initially. Additionally, the adapter mounting apertures 42 and base mounting pin 40 arrangement allows for better alignment between the base 12, adapters 22, and cover 14 so that an easier installation is achieved.

It will be understood that implementations are not limited to the specific components disclosed herein, as virtually any components consistent with the intended operation of a method and/or system implementation for a cable conduit electrical box may be utilized. Components may comprise any shape, size, style, type, model, version, class, grade, measurement, concentration, material, weight, quantity, and/or the like consistent with the intended operation of a method and/or system implementation for a cable conduit electrical box.

The concepts disclosed herein are not limited to the specific implementations shown herein. For example, it is specifically contemplated that the components included in a particular implementation of a cable conduit device may be formed of any of many different types of materials or combinations that can readily be formed into shaped objects and that are consistent with the intended operation of a cable conduit electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the cable conduit electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable conduit electrical box, it should be readily apparent that a number of modifications may be made without departing from the spirit thereof and that these implementations may be applied to other cable conduit electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A cable conduit electrical box comprising:
   a base having a front surface and being mountable to a wall, the base having at least one opening for receiving a cable conduit and at least two mounting pins extending forward of the base, one of the at least two mounting pins on each side of the at least one opening;
   a cover removably attached to the base and covering substantially all of the front surface of the base, the cover having at least one track having a track slot on an inside surface of the cover, wherein the at least one track is oriented to face the base when the cover is positioned on the base; and
   an adapter having at least one mounting tab oriented to be removably positioned within the at least one track and at least two adapter mounting apertures oriented to be removably positioned around the at least two mounting pins;
   wherein the at least one track and the adapter are positioned between the base and the cover when the cover is attached to the base.

2. The cable conduit electrical box of claim 1, the adapter further comprising a conduit opening extending therethrough, the conduit opening being positioned adjacent to the front surface of the base when the at least two adapter mounting apertures is oriented around the at least two mounting pins.

3. The cable conduit electrical box of claim 1, the cover further comprising at least two cover connectors on the inside surface of the cover, the at least two cover connectors extending inward of the inside surface and configured to engage a portion of the base when the cover is removably attached to the base.

4. The cable conduit electrical box of claim 1, the cover further comprising a locking tab on the inside surface of the cover at the track slot.

5. The cable conduit electrical box of claim 1, the base further comprising a base opening positioned on at least one edge of the base.

6. The cable conduit electrical box of claim 1, wherein the at least one track and the at least two mounting poles are in physical contact with the adapter when the at least two adapter mounting apertures oriented are removably positioned around the at least two mounting pins.

7. The cable conduit electrical box of claim 1, further comprising at least two adapters positioned between the base of the cover on at least two sides of the base.

8. The cable conduit electrical box of claim 1, further comprising at least three adapters positioned between the base and the cover on at least three sides of the base.

9. The cable conduit electrical box of claim 1, the base further comprising a central opening extending therethrough.

* * * * *